(12) United States Patent
Guo et al.

(10) Patent No.: US 11,215,138 B1
(45) Date of Patent: Jan. 4, 2022

(54) LOW-NOISE MAIN BEARING CAP FOR INTERNAL COMBUSTION ENGINE

(71) Applicant: Harbin Engineering University, Harbin (CN)

(72) Inventors: Jie Guo, Harbin (CN); Xinyu Zhang, Harbin (CN); Wenping Zhang, Harbin (CN); Ye Wang, Harbin (CN)

(73) Assignee: Harbin Engineering University, Harbin (CN)

( * ) Notice: Subject to any disclaimer, the term of this patent is extended or adjusted under 35 U.S.C. 154(b) by 0 days.

(21) Appl. No.: 17/121,951

(22) Filed: Dec. 15, 2020

(30) Foreign Application Priority Data

Aug. 31, 2020 (CN) .......................... 202010894652.X

(51) Int. Cl.
| | |
|---|---|
| *F16C 9/02* | (2006.01) |
| *F16C 27/02* | (2006.01) |
| *F02F 7/00* | (2006.01) |
| *F16C 27/06* | (2006.01) |
| *F16C 17/02* | (2006.01) |

(52) U.S. Cl.
CPC ............ *F02F 7/0053* (2013.01); *F02F 7/008* (2013.01); *F16C 9/02* (2013.01); *F16C 17/022* (2013.01); *F16C 27/02* (2013.01); *F16C 27/06* (2013.01); *F16C 27/063* (2013.01); *F16C 2360/22* (2013.01)

(58) Field of Classification Search
CPC . F02F 7/0053; F02F 7/008; F16C 9/02; F16C 17/022; F16C 27/02; F16C 27/06; F16C 27/063; F16C 2360/22

USPC .......................................................... 384/434
See application file for complete search history.

(56) References Cited

U.S. PATENT DOCUMENTS 4,362,341 A * 12/1982 Matsumoto ........... F02F 7/0053
384/220

FOREIGN PATENT DOCUMENTS

| DE | 3309792 A1 * | 9/1984 | ............ F16C 27/063 |
| DE | 19617607 A1 * | 11/1997 | .............. F16C 27/02 |

* cited by examiner

*Primary Examiner* — Phillip A Johnson
(74) *Attorney, Agent, or Firm* — HEA Law PLLC; Darrin A. Auito

(57) ABSTRACT

A low-noise main bearing cap for an internal combustion engine is designed that includes a main bearing cap body, wherein the main bearing cap body is connected to an engine body main bearing seat. The main bearing cap body is provided with a vibration isolator A vibration isolation structure is provided between the main bearing cap body and the vibration isolator The main bearing cap body is connected with the vibration isolator through a connector The vibration isolation structure comprises an S-shaped structure and an oil film gap, and the vibration isolator is provided with an oil inlet passage which is communicated with the oil film gap. The present design solves the control problem of the main bearing vibration source caused by the main bearing load.

10 Claims, 2 Drawing Sheets

LOW-NOISE MAIN BEARING CAP FOR INTERNAL COMBUSTION ENGINE

CROSS-REFERENCE TO RELATED APPLICATIONS

This application claims priority to Chinese application number 202010894652.X, filed Aug. 31, 2020, with a title of LOW-NOISE MAIN BEARING CAP FOR INTERNAL COMBUSTION ENGINE. The above-mentioned patent application is incorporated herein by reference in their entirety.

TECHNICAL FIELD

The present invention relates to the technical field of internal combustion engines, in particular to a low-noise main bearing cap for an internal combustion engine.

BACKGROUND

At present, the requirements for vibration and noise control of internal combustion engines are getting higher and higher, and the noise level of internal combustion engines has become an important index of internal combustion engine design. Noise sources of internal combustion engines comprise combustion noise, mechanical noise and aerodynamic noise. Combustion noise and mechanical noise are referred to as structural radiation noise, which is radiated through the structural surface of an internal combustion engine. The existing experimental results show that the noise generated by the engine body and its accessories accounts for 50~70% of the total noise of the internal combustion engine. The main bearing load is one of the main excitation sources causing the vibration of the engine body structure and the radiation noise, and is the main contributor to the vibration of the engine support. Therefore, controlling the vibration caused by the main bearing load is one of the main ways to design the internal combustion engine with low vibration and low noise.

At present, the existing control methods for the transmission paths of the main bearing load or vibration of an internal combustion engine are mainly to improve structural rigidity by adding the rib structure or increasing the diaphragm thickness in the vicinity of the main bearing. The disadvantage of this approach is that it significantly increases the overall weight. At present, the control effect on vibration and noise of an internal combustion engine has reached the limit, and the main bearing load is still one of the main contributors to the radiation noise of the internal combustion engine structure.

At the same time, the related literature reports on the vibration and radiation noise control of the internal combustion engine structure have solved the main problems such as the improvement of a dynamic model of a crank-connecting rod mechanism, the optimization of a piston skirt profile, the optimization of bearing lubrication performance, the analysis of crankshaft bending-torsion coupling vibration, the optimization of a crankshaft three-dimensional vibration model, etc., but the main bearing load or its vibration control is not considered as the key point.

For crankshaft vibration control, the torsional vibration of a crankshaft is mainly controlled by installing a torsional vibration damper, or the axial vibration of a crankshaft is controlled by installing a longitudinal vibration damper, and the bending vibration of a crankshaft is indirectly controlled. However, the vibration of the main bearing is not effectively controlled by installing a torsional vibration damper or a longitudinal vibration damper, and sometimes it will be strengthened. Therefore, the current progress seldom involves the research of a vibration control method and mechanism of the main bearing of the internal combustion engine. Controlling the vibration of the main bearing of the internal combustion engine, and then the vibration transmitted to the engine body is a key problem that needs to be solved urgently at present.

SUMMARY

The object of the present invention is to provide a low-noise main bearing cap for an internal combustion engine to solve the control problem of the main bearing vibration sources caused by the main bearing load.

In order to achieve the above object, the present invention provides the following scheme: the present invention provides a low-noise main bearing cap for an internal combustion engine, comprising a main bearing cap body, wherein the main bearing cap body is connected to a main bearing seat of engine block; wherein the main bearing cap body is provided with a vibration isolator, a vibration isolation structure is provided between the main bearing cap body and the vibration isolator, and the main bearing cap body is connected with the vibration isolator through a connector; the vibration isolation structure comprises an S-shaped structure and an oil film gap, and the vibration isolator is provided with an oil inlet passage which is communicated with the oil film gap.

Preferably, the S-shaped structure penetrates axially along the main bearing cap body, the edge of the S-shaped structure are rounded; the oil film gap penetrates axially along the main bearing cap body, and both sides of the oil film gap are provided with the S-shaped structure.

Preferably, the connector comprises an ac-shaped limit key slot and an arc-shaped limit key, the arc-shaped limit key slot is correspondingly provided at both ends of the main bearing cap body and the vibration isolator, and the arc-shaped limit key is provided between the main bearing cap body and the arc-shaped limit key slot of the vibration isolator.

Preferably, the arc-shaped limit key slot and the arc-shaped limit key are located at both ends of the oil film gap between the main bearing cap body and the vibration isolator, which are used to limit radial displacement at both ends of the vibration isolator and allow circumferential displacement at both ends of the vibration isolator; the arc-shaped limit key slot and the arc-shaped limit key both have curvatures, and the curvature centers of the arc-shaped limit key slot and the arc-shaped limit key coincide with the center of a circle of the main bearing.

Preferably, the oil inlet passage penetrates radially along the vibration isolator so that lubricating oil enters the oil film gap through the oil inlet passage.

Preferably, two oil inlet passages are symmetrically provided, the two oil inlet passages are located on the central section of the vibration isolator in the axial direction, each of the oil inlet passages is located between two S-shaped structures on the same side; two oil film gaps are correspondingly provided, and each of the oil film gaps is connected with one of the oil inlet passages.

Preferably, one side of the vibration isolator close to the oil film gap is provided with an oil storage hole, and the oil storage hole is an axially penetrating round hole for storing lubricating oil.

Preferably, both sides of the main bearing cap body are connected with end sealing cover plates through end sealing bolts.

Preferably, an end sealing gasket is provided between the end sealing cover plate and the main bearing cap body.

Preferably, the main bearing cap body is provided with a main bearing bolt hole, and the main bearing cap body goes through the main bearing bolt hole and is fixed on the engine block main bearing seat through the main bearing bolt.

Compared with the prior art, the present invention has the following technical effects.

(1) An S-shaped structure, an oil film gap, an oil inlet passage, etc. are processed on the main bearing cap, only an end sealing cover plate, an end sealing bolt and an end sealing gasket are provided on the additional mass, and the additional mass is far less than the existing technical measures to improve the structural rigidity by adding a rib beam structure or increasing the thickness of the diaphragm in the vicinity of the main bearing of the internal combustion engine;

(2) An S-shaped structure, an oil film gap and other structures are close to the main bearing hole, which play the role of vibration isolation together and are not contradictory to the existing main bearing cap. They can be used alone or on the basis of the existing main bearing cap, further attenuating the vibration of the main bearing cap and significantly reducing the vibration transmitted to the engine block by the main bearing bolts, thus further reducing the vibration of the engine support and the vibration and noise of the whole engine;

(3) The lubricating oil in the oil film gap directly comes from the main bearing lubricating oil path, and leaks into the oil pan through the gap at the end sealing cover plate, no additional oil supply and return system is needed, and the system is simple.

BRIEF DESCRIPTION OF THE DRAWINGS

In order to explain the embodiments of the present invention or the technical scheme in the prior art more clearly, the drawings needed in the embodiments will be briefly introduced hereinafter. Obviously, the drawings in the following description are only some embodiments of the present invention. Those skilled in the art can obtain other drawings according to these drawings without paying creative labor.

Figure 1:
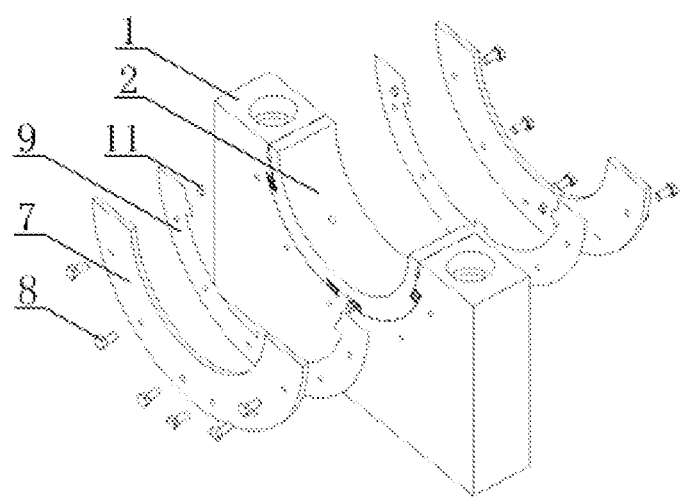
FIG. 1 is a schematic diagram illustrating the connection of various components of a low-noise main bearing cap for an internal combustion engine according to the present invention.
Figure 2:
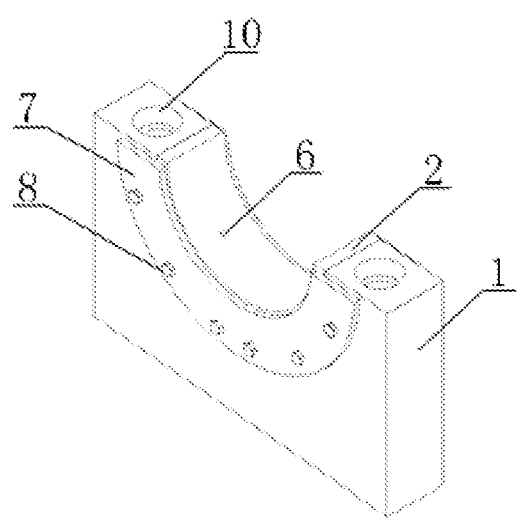
FIG. 2 is a schematic diagram illustrating the assembly structure of a low-noise main bearing cap for an internal combustion engine according to the present invention.
Figure 3:
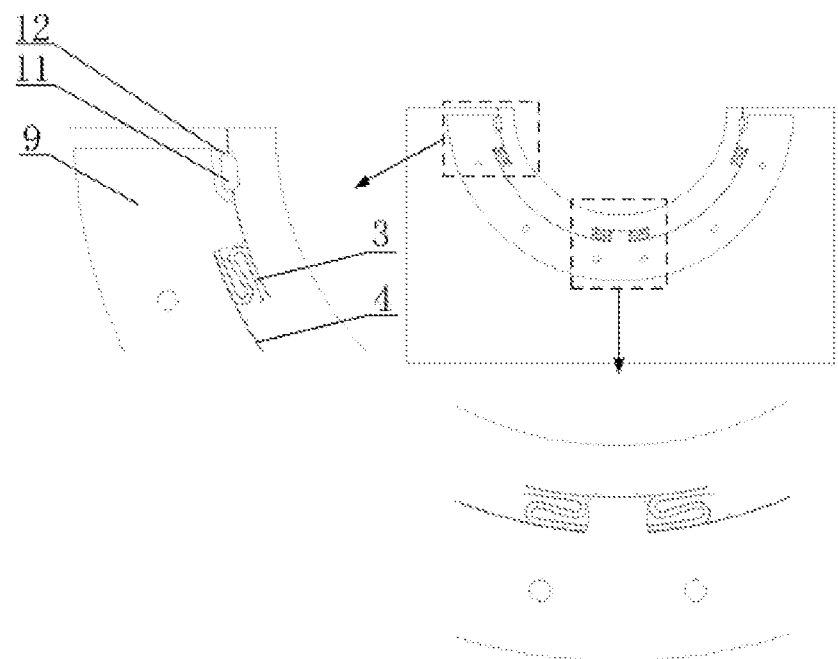
FIG. 3 is a schematic diagram illustrating the assembly of an end sealing gasket and a limit key of a low-noise main bearing cap for an internal combustion engine according to the present invention.

In the figures, main bearing cap body 1, vibration isolator 2, S-shaped structure 3, oil film gap 4, oil storage hole 5, oil inlet passage 6, end sealing cover plate 7, end sealing bolt 8, end sealing gasket 9, main bearing bolt hole 10, arc-shaped limit key 11, arc-shaped limit key slot 12.

DESCRIPTION OF THE EMBODIMENTS

The technical scheme in the embodiments of the present invention will be described clearly and completely with reference to the drawings in the embodiments of the present invention. Obviously, the described embodiments are only part of the embodiments of the present invention, rather than all of the embodiments. Based on the embodiments of the present invention, all other embodiments obtained by those skilled in the art without paying creative labor belong to the scope of protection of the present invention.

The object of the present invention is to provide a low-noise main bearing cap for an internal combustion engine to solve the control problem of the main bearing vibration sources caused by the main bearing load.

In order to make the above objects, features and advantages of the present invention more obvious and easy to understandable, the present invention will be further explained in detail with reference to the drawings and specific embodiments.

Embodiment 1

As shown in FIGS. 1-4, this embodiment provides a low-noise main bearing cap for internal combustion engines, comprising a main bearing cap body 1, wherein the main bearing cap body 1 is connected to a engine body main bearing seat. The main bearing bolt holes 10 are provided on both sides of the top of the main bearing cap body 1. When in use, the main bearing cap body 1 goes through the main bearing bolt hole 10 and is fixed on the engine body main bearing seat through the main bearing bolt.

In this embodiment, the main bearing cap body 1 is provided with a vibration isolator 2. A vibration isolation structure is provided between the main bearing cap body 1 and the vibration isolator 2. The vibration isolation structure comprises an S-shaped structure 3 and an oil film gap 4. The vibration isolator 2 is provided with an oil inlet passage 6 which is communicated with the oil film gap 4. During operation, the lubricating oil between a main bearing shell and a main journal can enter and fill the oil film gap 4 through the oil inlet passage 6. During operation, the vibration isolator 2 is deformed when it is loaded by the main journal. The squeeze oil film in the S-shaped structure 3 and the oil film gap 4 interacts with the main bearing cap body 1 to isolate vibration.

Figure 4:
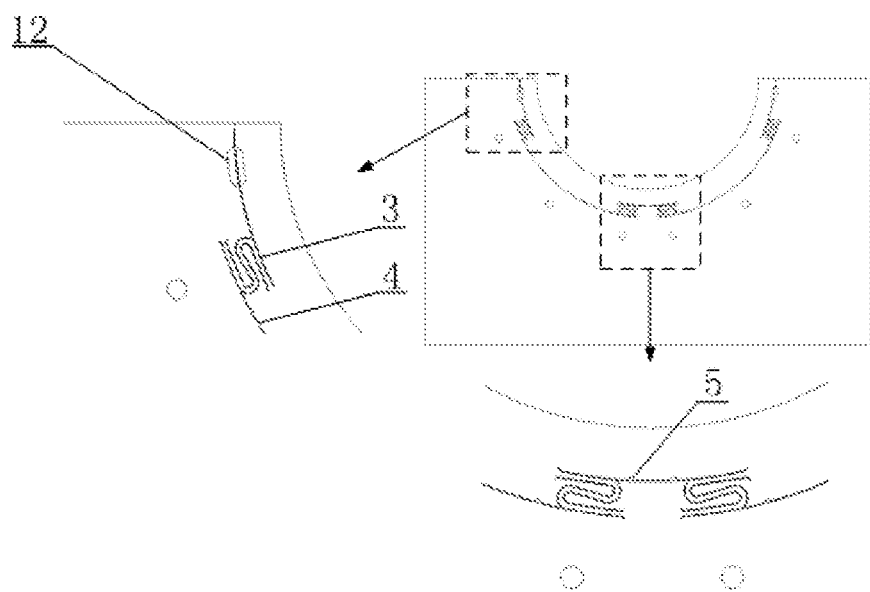
FIG. 4 is a schematic diagram of a vibration isolation structure, a limit key slot and an oil storage hole structure of a low-noise main bearing cap for an internal combustion engine according to the present invention.

In this embodiment, as shown in FIG. 4, the S-shaped structure 3 penetrates axially along the main bearing cap body 1, and the edges of the S-shaped structure 3 are rounded to prevent stress concentration; wherein the S-shaped structures 3 are distributed at both ends of the oil film gap 4, and the material removed part of the S-shaped structures 3 is communicated with the oil film gap 4.

In this embodiment, the oil film gap 4 penetrates axially along the main bearing cap body 1.

In this embodiment, one side of the vibration isolator 2 close to the oil film gap 4 is provided with an oil storage hole 5, which is an axially penetrating round hole for storing a certain amount of oil, so as to prevent the oil film gap 4 and the oil inlet passage 6 from being insufficiently filled when the relative movement between the vibration isolator 2 and the main bearing cap body 1 is large.

In this embodiment, the oil inlet passage 6 penetrates radially along the vibration isolator 2, so that lubricating oil can enter the oil film gap 4 through the oil inlet passage 6. Furthermore, two oil inlet passages 6 are symmetrically provided and are located on the central section of the vibration isolator 2 in the axial direction, each of the oil inlet passages 6 is located between two S-shaped structures 3 on the same side; two oil film gaps 4 are correspondingly provided, the two oil film gaps 4 are symmetrically distributed between the main bearing cap body 1 and the vibration isolator 2, and each of the oil film gaps 4 is connected with one of the oil inlet passages 6; either side of each of the oil film gaps 4 is provided with an S-shaped structure 3, and a total of four S-shaped structures 3 are provided.

In this embodiment, the main bearing cap body 1 and the vibration isolator 2 are connected through a connector which comprises an arc-shaped limit key slot 12 and an arc-shaped limit key 11. Arc-shaped limit key slots 12 are correspondingly provided at both ends of the oil film gap 4 between the main bearing cap body 1 and the vibration isolator 2, and arc-shaped limit keys 11 are provided between the main bearing cap body 1 and the arc-shaped limit key slot 12 of the vibration isolator 2, which are used to limit radial displacement at both ends of the vibration isolator 2 and allow circumferential displacement at both ends of the vibration isolator 2. The arc-shaped limit key 11 and the arc-shaped limit key slot 12 both have a certain curvature, and the curvature centers thereof coincide with the center of a circle of the main bearing.

In this embodiment, both sides of the main bearing cap body 1 are connected with end sealing cover plates 7 through end sealing bolts 8, and an end sealing gasket 9 is provided between the end sealing cover plate 7 and the main bearing cap body 1. The function of the end sealing gasket 9 is to leave a gap between the end sealing cover plate 7 and the vibration isolator 2, which is used as an oil drain outlet for oil in the oil film gap 4. Oil in the oil film gap 4 can only flow out from the gap left by the end sealing gasket 9, which has a throttling action and produces a damping effect.

The damping effect and the S-shaped structure 3 between the vibration isolator 2 and the main bearing cap body 1 together realize the vibration isolation of the low-noise main bearing cap. When the crankshaft load acts on the vibration isolator 2, the vibration transmitted to the engine body through the main bearing bolts will be greatly reduced due to the existence of vibration isolation.

The vibration of the main bearing of an internal combustion engine mainly occurs before and after the ignition of each cylinder. At this time, the main bearing load is vertically downward and acts on the main bearing cap; the low-noise main bearing cap provided by the present invention can suppress the vibration of the main bearing cap of the internal combustion engine or dissipate the vibration energy, thereby effectively reducing the vibration and noise of the internal combustion engine.

In the present invention, a specific example is applied to explain the principle and implementation of the present invention, and the explanation of the above embodiments is only used to help understand the method and core idea of the present invention; at the same time, according to the idea of the present invention, there will be some changes in the specific implementation and application scope for shoes skilled in the art. To sum up, the content of this specification should not be construed as limiting the present invention.

What is claimed is:
1. A low-noise main bearing cap for an internal combustion engine, comprising:
   a main bearing cap body, wherein the main bearing cap body is connected to an engine body main bearing seat;
   wherein the main bearing cap body is provided with a vibration isolator, a vibration isolation structure is provided between the main bearing cap body and the vibration isolator, and the main bearing cap body is connected with the vibration isolator through a connector;
   wherein the vibration isolation structure comprises an S-shaped structure and an oil film gap, and the vibration isolator is provided with an oil inlet passage which is communicated with the oil film gap.

2. The low-noise main bearing cap for the internal combustion engine according to claim 1, wherein the S-shaped structure penetrates axially along the main bearing cap body, the S-shaped structure comprises rounded edges; the oil film gap penetrates axially along the main bearing cap body, and both sides of the oil film gap are provided with the S-shaped structure.

3. The low-noise main bearing cap for the internal combustion engine according to claim 1, wherein the connector comprises an arc-shaped limit key slot and an arc-shaped limit key, the arc-shaped limit key slot is correspondingly provided at both ends of the main bearing cap body and the vibration isolator, and the arc-shaped limit key is provided between the main bearing cap body and the arc-shaped limit key slot of the vibration isolator.

4. The low-noise main bearing cap for the internal combustion engine according to claim 3, wherein the arc-shaped limit key slot and the arc-shaped limit key are located at both ends of the oil film gap between the main bearing cap body and the vibration isolator; the arc-shaped limit key slot and the arc-shaped limit key both have curvatures, and the curvature centers of the arc-shaped limit key slot and the arc-shaped limit key coincide with the center of a circle of the main bearing.

5. The low-noise main bearing cap for the internal combustion engine according to claim 1, wherein the oil inlet passage penetrates radially along the vibration isolator so that lubricating oil enters the oil film gap through the oil inlet passage.

6. The low-noise main bearing cap for the internal combustion engine according to claim 5, wherein two oil inlet passages are symmetrically provided, the two oil inlet passages are located on a central section of the vibration isolator in the axial direction, each of the oil inlet passages is located between two S-shaped structures on the same side; two oil film gaps are correspondingly provided, and each of the oil film gaps is connected with one of the oil inlet passages.

7. The low-noise main bearing cap for the internal combustion engine according to claim 6, wherein one side of the vibration isolator close to the oil film gap is provided with an oil storage hole, and the oil storage hole is an axially penetrating round hole configured to store lubricating oil.

8. The low-noise main bearing cap for the internal combustion engine according to claim 1, wherein both sides of the main bearing cap body are connected to end sealing cover plates through end sealing bolts.

9. The low-noise main bearing cap for the internal combustion engine according to claim 8, wherein an end sealing gasket is provided between the end sealing cover plate and the main bearing cap body.

10. The low-noise main bearing cap for the internal combustion engine according to claim 1, wherein the main bearing cap body is provided with a main bearing bolt hole, and the main bearing cap body goes through the main bearing bolt hole and is fixed on the engine body main bearing seat through the main bearing bolt.

\* \* \* \* \*